United States Patent [19]

Segrest et al.

[11] 3,960,171

[45] June 1, 1976

[54] HELMET EXHAUST VALVE

[75] Inventors: Steven F. Segrest; Josef M. Gardner, both of Panama City, Fla.

[73] Assignee: The United States of America as represented by the Secretary of the Navy, Washington, D.C.

[22] Filed: Jan. 27, 1975

[21] Appl. No.: 544,467

[52] U.S. Cl................................ 137/495; 137/510
[51] Int. Cl.².................. F16K 17/06; F16K 17/18
[58] Field of Search.................. 137/63 R, 216, 217, 137/218, 469, 495, 522, 523, 437, 442, 444, 510

[56] References Cited
UNITED STATES PATENTS

| | | | |
|---|---|---|---|
| 2,704,548 | 3/1955 | Ralston | 137/510 X |
| 2,905,221 | 9/1959 | Nonnamaker | 137/510 X |
| 3,254,668 | 6/1966 | Gardner | 137/510 |

*Primary Examiner*—Henry T. Klinksiek
*Attorney, Agent, or Firm*—Richard S. Sciascia; Harvey A. David; Don D. Doty

[57] ABSTRACT

A diver's exhaust valve is described that is characterized by small size, smooth flow, and freedom from fouling by foreign matter. The valve comprises a valve member in the form of a spring and water biased diaphragm that separates the exhaust gas from the water which acts to close the valve. The disposition and configuration of flow passages produce continual flushing, while permitting adequate flow with a valve of smaller than usual size.

3 Claims, 2 Drawing Figures

HELMET EXHAUST VALVE

STATEMENT OF THE GOVERNMENT INTEREST

The invention described herein may be manufactured and used by or for the Government of the United States of America for Governmental purposes without the payment of any royalties thereon or therefor.

BACKGROUND OF THE INVENTION

This invention relates to underwater diving equipment and more particularly to an improved exhaust valve for the controlled venting of spent or excess breathing gas from a diving helmet or mask.

Diving suits or rigs have commonly been provided with exhaust valves, usually mounted on the helmet, that serve in the nature of a one-way, or check valve, to prevent entry of water while permiting exit of gas from the suit when pressure therein exceeds a predetermined differential between the surrounding water pressure and that existing in the suit. These valves have typically been adjustable by the diver to select a pressure differential that will afford the best compromise between factors of bouyancy, freedom from squeeze by the suit, and adequate ventilation.

Additionally, exhaust valves are often provided with an override feature in the form of a button that the diver can press with his chin or head to quickly open the valve wide in the event it becomes necessary to rapidly dump air to make the suit heavy, as when in danger of a "blow-up," or when it is necessary to greatly increase ventilation, for example to clear carbon dioxide build-up from the suit.

DISCUSSION OF THE PRIOR ART

A relatively conventional diver's exhaust valve of the poppet type is described in U.S. Pat. No. 2,388,674 to J. W. Browne. In that valve device, a rigid poppet valve element is biased toward its seat by a compression spring with a force that is selectively adjustable by rotation of a cap that is threaded on the valve body. The cap is apertured to admit water, the pressure of which acts on the exposed effective area of the poppet valve element in addition to the spring pressure. Exhaust gas exits through the valve body from the interior of the helmet, between the poppet valve element and its seat, and out the same apertures in the cap as the water enters.

Among the disadvantages of the foregoing construction is the requirement of a rather massive valve structure in order to obtain the necessary volume of flow therethrough to meet all circumstances of use. Also, there is a tendency for mud, slit, and/or sand to enter with water through the apertures in the adjusting cap and to accumulate in the valve pocket or chamber where it interferes with proper operation of the valve member, both in unseating and in seating, when the diver is working in mud, silt, or sand. Another disadvantage is a tendency of the valve to "chatter." This is due apparently to the fact that bubbles exit through the same chamber and cap ports as water enters to exert pressure on the exposed area of the poppet valve. Chattering, or any other unnecessary noise, is particularly undesirable in a diving helmet where telephone communication is usually marginal, at best. Moreover, in diving rigs intended for military use, such as acoustic mine disposal or covert operations, quiet operation of valves is of utmost importance. In addition, such a valve is difficult to adjust with a fine degree of precision as to pressure differential.

Another form of exhaust valve is disclosed in U.S. Pat. No. 3,138,155 to G. Bould. That valve is of the type wherein the rigid poppet valve element has been replaced by a flexible rubber valve element. As in the case of the metal poppet valve, the exhaust bubbles must escape through the same chamber and openings as the surrounding water must enter to act on the rubber valve element. The valve is therefore noisier than is desirable, and subject to fouling by foreign matter.

Other forms of exhaust valves utilizing perforated rubber valve elements have been known, and which have been subject to the foregoing disadvantages.

SUMMARY OF THE INVENTION

The present invention aims to overcome most or all of the foregoing disadvantages and shortcomings of the prior art through the provision of an improved exhaust valve for diving systems that obviates the requirement of exhaust bubbles passing through the same chamber and ports as the water that acts on the effective exposed area of a rubber diaphragm valve element.

With the foregoing in mind it is a principal object of the invention to provide an improved exhaust valve for diving helmets, masks, or suits, which valve may be of compact construction while affording adequate flow, which features are particularly desirable for use with modern, light weight and streamlined helmets and masks.

Another object of the invention is to provide a particularly quiet exhaust valve that is adjustable with ease and precision to establish and maintain a desired pressure differential between the interior and exterior of a diving rig.

Yet another object is the provision of a diver's exhaust valve of the foregoing character that is also highly resistant to fouling by foreign matter in the water, such as sand, mud, or slit.

Still another object is the provision of an exhaust valve, for diving use, that is rugged, reliable, of economical construction, and readily disassembled for inspection and repair.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
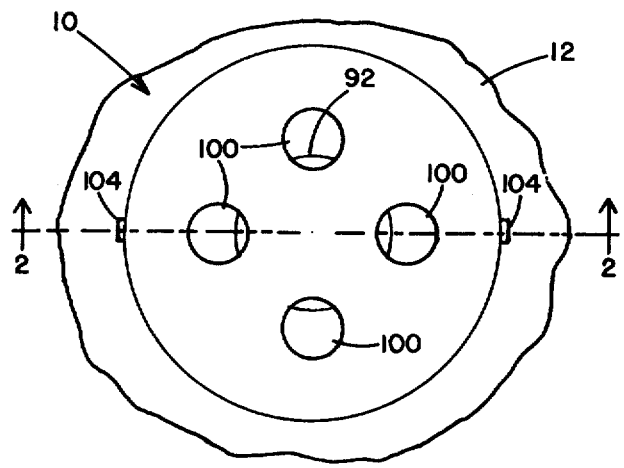
FIG. 1 is a front elevational view of a diver's exhaust valve embodying the invention, shown with a fragment of an associated helmet wall.

In the form of the invention illustrated in the drawings and described hereinafter, a diver's exhaust valve 10 is mounted on a side wall 12 of a portion of a diving apparatus, usually a helmet, that is intended to provide a confined space for breathing gas. Valve 10 serves to exhaust excess or spent breathing gas from the helmet into the surrounding water, while maintaining a predetermined pressure differential between the interior of the helmet and the water pressure at the level of the valve, the interior pressure being usually held from one-half to two pounds per square inch in excess of the water pressure.

Figure 2:
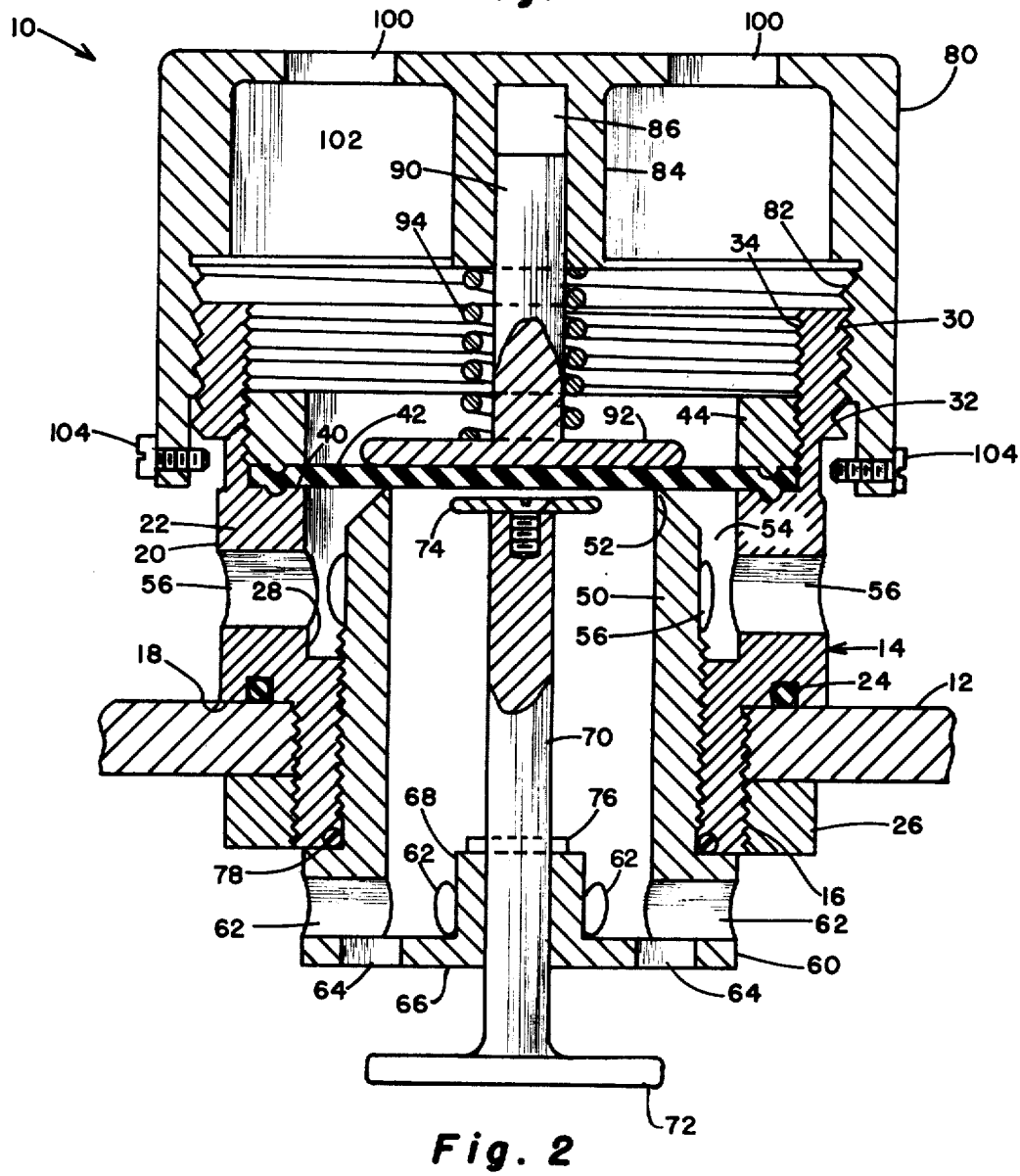
FIG. 2 is an enlarged sectional view of the valve of FIG. 1, taken substantially along line 2—2 thereof.

Referring to FIG. 2, valve 10 comprises a hollow valve body 14, having an externally and internally threaded nipple portion 16 extending therough an internally threaded opening in helmet wall 12. A shoulder 18, between nipple portion 16 and a cylindrical outer surface 20 of a cylindrical wall portion 22 of body 14, bears against wall 12 and is relieved to carry an O-ring 24 for effecting a seal between valve 10 and the helmet wall. A retaining nut 26 is threaded on nipple portion 16 and bears against the inner surface of wall 12.

Valve body 14 is formed with the cylindrical inner surface 28 of wall portion 22 having a greater diameter than the inner diameter of threaded nipple portion 16. The outer end wall portion 30 of valve body 14, that is the portion remote from nipple portion 16, is of greater internal diameter than wall portion 22 and is provided with external threads 32 and internal threads 34. An internal shoulder 40 is defined between wall portions 22 and 30 and serves as an annular clamping surface for the peripheral portion of a flexible imperforate diaphragm 42, formed of neoprene rubber or other suitably resilient material. Diaphragm 42 serves as a movable valve member, the function of which will be described as this specification proceeds. An externally threaded ring 44 is engaged with threads 34 and serves to clamp diaphragm 42 against shoulder 40.

A tubular valve seat member 50 is threaded into the nipple portion 16 of valve body 14 and extends concentrically into the interior thereof. Valve seat member 50 terminates in an annular valve seat 52 lying in, or substantially in, the same plane as shoulder 40 carrying diaphragm 42. Diaphragm 42 is normally in engagement with seat 52 so as to obturate the tubular valve seat member 50.

An annular chamber or space 54 is defined in valve body 14 between wall portion 22 and the tubular valve seat member 50. This annular space communicates freely with the surrounding water via a plurality of radially extending passages or ports 56 in wall 22.

Valve seat member 50 is provided with an enlarged head portion 60 within the helmet, portion 60 being provided with a plurality of ports 62 and 64 through which gas is enabled to egress from the helmet through valve 10. An end wall 66 of seat member 50 has a central boss 68 which is bored axially to slidingly support and guide a pushrod 70 extending from a valve override button 72 at the proximal end thereof with respect to a diver. The distal end of push-rod 70 carries a disc 74, adapted to engage diaphragm 42 and displace the same from seat 52 upon movement of button 72 by the diver. A pin 76 through push-rod 70 limits movement thereof away from diaphragm 42. An O-ring 78 is conveniently compressed between valve seat member 50 and the nipple portion 16 of body 14 to effect a water and gas tight seal therebetween.

Adjustably mounted on the outer end portion 30 of valve body 14 is a cup-shaped cap or knob 80 having internal screw-threads 82 in cooperative engagement with threads 32 of body 14. Knob 80 comprises an internal boss 84 having a guide bore 86 coaxially aligned with tubular valve seat member 50. Reciprocably received in guide bore 86 is the stem of a plunger 90 having a disc-shaped head 92 bearing against diaphragm 42. A compression spring 94 surrounds the plunger stem between boss 84 and plunger head 92, and reliliently acts on the latter to urge diaphragm 42 against valve seat 52. It will be noted that plunger head 92 is of greater diameter than seat 52.

Knob 80, which has openings or ports 100 placing the interior 102 thereof in open communication with surrounding water, is adjustable by virtue of threads 32 and 82 to increase or decrease the effective force with which plunger 90 presses diaphragm 42 toward seat 52. Screws 104, through the skirt of knob 80, limit outward movement of the knob and prohibit possible loss thereof.

The manner of adjusting and controlling the operation of valve 10 is essentially the same as has been the case with prior conventional exhaust valves with which most "hard hat" divers are familiar. That is, to increase the pressure differential, and hence increase bouyancy, the knob 80 is turned in one direction, and to decrease the pressure differential and bouyancy the knob is turned in the other direction. In order to quickly vent excess pressure, button 72 is pushed, thereby overriding the normal differential pressure requirement. Because of the familiar manner of use, no additional diver traning is required in the use of the valve 10.

Operation within the valve 10, however, is notably different in that exhaust gas flow is separated within the valve from the zone in which water of ambient pressure is acting on the valve element, or diaphragm, 42 in a direction to effect closing thereof. Thus, exhaust air flows from the helmet through ports 62, 64, tubular seat member 50, and, when the pressure thereof exceeds the combined effective pressure of the water in chamber 102 and of the spring 94, moves diaphragm 42 away from seat 52. Gas flowing between seat 52 and diaphragm 42 passes into the annular space 54 between seat member 50 and body wall 22, and thence through radial passages 56 to the ambient water. Because bubbles of gas do not travel through water in chamber 102, chatter and oscillations of diaphragm valve member 42 are avoided and exhaust flow is smooth and unimpeded while the desired pressure differential is maintained with precision. The radially disposed passages 56, being located as they are in connection with the annular space 54, result in a continuous flushing of the seat and gas passage areas in practically all possible diver positions or attitudes, thereby eliminating any likelihood of sand, silt, or mud affecting the operation of the valve.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A diver's exhaust valve comprising:
   a hollow valve body including stepped first, second, and third cylindrical wall portions, the respective inside diameters of which increase progressively from one end of said body to the other end thereof;
   a tubular valve seat member fixed to said first wall portion and extending coaxially into said valve body in spaced concentric relation with said second wall portion so as to define therewith an annular space, said valve seat member presenting an annular valve seat lying in a transverse plane between said second and third wall portions;

a flexible, imperforate diaphragm lying in said plane and having its periphery fixed in sealed relation to said valve body, said diaphragm being adapted to move into and out of engagement with said annular valve seat;

a cup-shaped knob having an internally threaded side wall portion adjustably engaged with threads on said third cylindrical wall portion of said valve body;

a plunger having a head portion bearing against said diaphragm;

a compression spring disposed between said plunger head portion and said knob, and operative to urge said diaphragm toward said annular seat with a spring exerted biasing force selected by adjustment of said knob;

said knob including at least one port for admitting ambient water pressue to said diaphagm so as to urge said diaphragm toward said seat; and said second cylindrical wall portion having a plurality of radially extending ports communicating between said annular space and the exterior of said valve so that a portion of said diaphragm overlying said annular space is subjected to ambient water pressure acting in a direction away from said seat, whereby when exhaust gas pressure in said tubular valve member acts on said diaphragm with a force that exceeds said spring exerted biasing force, said diaphragm is moved from said seat to permit gas to pass between said seat and said diaphragm, through said annular space, and out said radially extending ports.

2. An exhaust valve as defined in claim 1, and further comprising: override means, mounted for axial movement within said tubular valve seat member, for overcoming said biasing force and moving said diaphragm means away from said annular valve seat irrespective of said exhaust gas pressure.

3. An exhaust valve as defined in claim 2, and wherein: said override means comprises a push-rod reciprocably supported by guide means in said tubular valve seat member, and a button on said push rod, said button being disposed for actuation by a diver.

* * * * *